June 20, 1961  M. G. D'AMICO  2,988,913
ARTICLE TESTING APPARATUS
Filed July 13, 1959  3 Sheets-Sheet 1
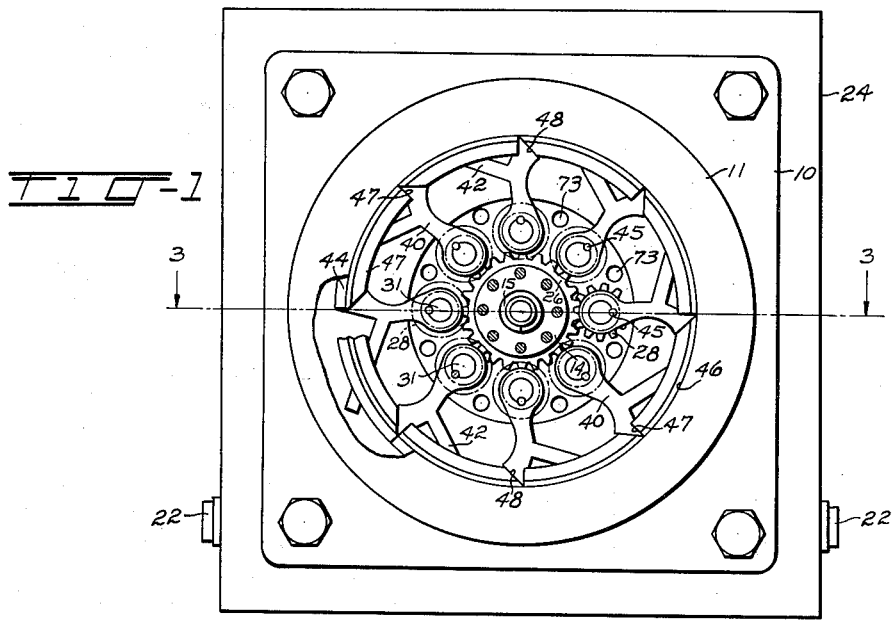
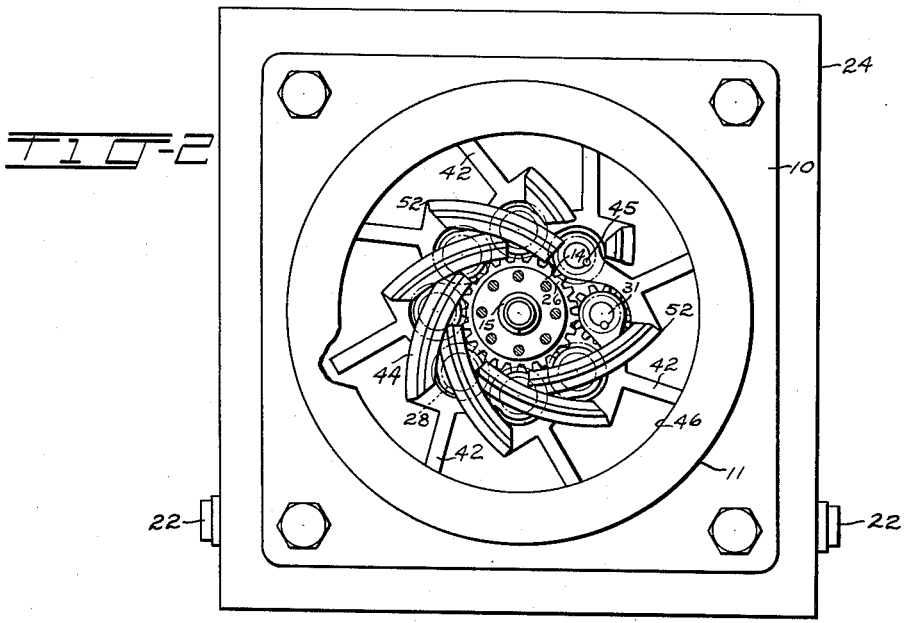
INVENTOR
M.G. D'AMICO
By S. Gundersen
ATTORNEY

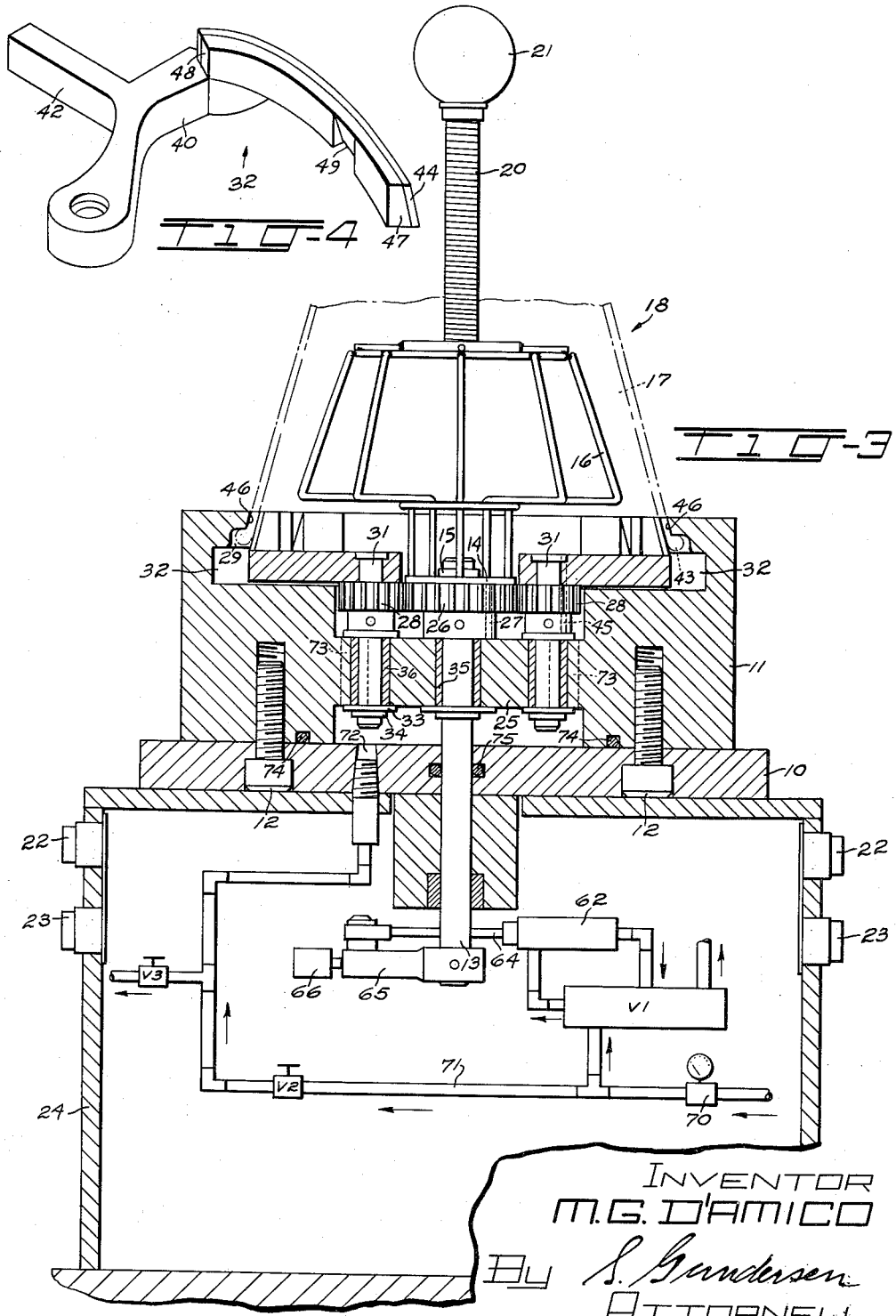

United States Patent Office 2,988,913
Patented June 20, 1961

2,988,913
ARTICLE TESTING APPARATUS
Michael G. D'Amico, Hoboken, N.J., assignor to Western Electric Company, Incorporated, New York, N.Y., a corporation of New York
Filed July 13, 1959, Ser. No. 826,601
5 Claims. (Cl. 73—37)

This invention relates to article testing devices and particularly to a device for testing resilient articles such as lineman's rubber gloves.

Heretofore, in the testing of lineman's gloves the glove gauntlet was stretched over a fixed annular head and securely clamped thereto by an outer ring concentrically disposed about the head. The diameter of the head was of such constant dimension that the groove could be stretched thereover; however, when large quantities of smaller size gloves were tested the repeated stretching of the gloves over the head became more difficult and tiring to the operator and resulted in a considerable loss of time. Further, the testing was largely manually performed requiring stretching the glove over the head, levering the head so as to clamp the glove, opening and closing the air valve, grasping the glove when opening the air exhaust and unclamping the glove from the head.

The object of this invention is to overcome the above difficulties and time consuming operation, and provide a device capable of testing any size glove in a simple and expeditious manner.

Generally, according to the invention, the glove is simply slipped over a clamping apparatus which is expanded to clamp the glove gauntlet. When the gauntlet is expanded and clamped, air is automatically admitted to inflate the glove and the operator visibly inspects it.

In a preferred embodiment, the apparatus includes a fixed cylinder having a central opening therein for a main driving gear for simultaneously interengaging a plurality of gears located circumferentially thereto. Upon the actuation of the main gear, each gear drives a shaft having a clamping element thereon which extends the clamps radially to expand and secure the gauntlet against the cylinder wall to produce a continuous seal about the gauntlet.

Other objects and a fuller understanding of the invention may be had by referring to the following description and claims, taken in conjunction with the accompanying drawing, in which:

FIG. 1 is a plan view of the device in its closed clamping position;

FIG. 2 is a plan view of the device in its normally open retracted position;

FIG. 3 is a front cross sectional view taken along line 3—3 of FIG. 1 including the hydraulic network;

FIG. 4 is an isometric view of the dog clamp incorporated in the invention; and

Figure 5:
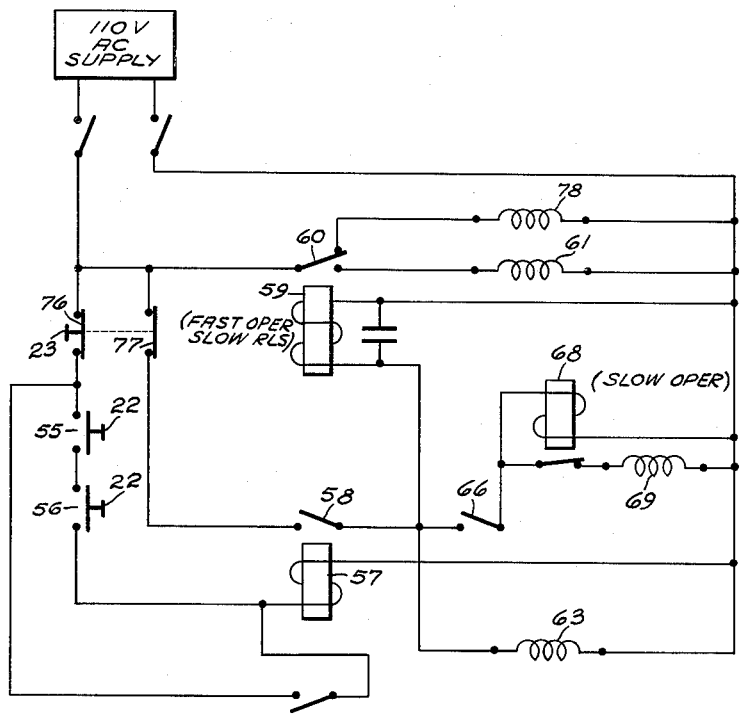
FIG. 5 is a schematic view of the electrical network.

With reference to the accompanying drawing, the apparatus includes a base 10 and a cylindrically shaped clamping head 11 connected thereto by screws 12. A main drive shaft 13, centrally disposed within the head 11, has connected at one end a support 14 secured by a retaining clip 15 upon which a wire mushroom basket 16 is welded for guiding the gauntlet opening 17 of the glove 18 into the clamping position (FIG. 3).

A spring shaft 20 is connected at one end to the upper portion of the basket 16 and extends in a normal vertical position therefrom. A glove support 21, preferably spherically shaped so as to prevent any puncturing of the glove, is affixed at the other end of shaft 20 for holding the glove and preventing its collapse when the device is activated as the operator is required to use both hands to press a pair of inflating and deflating switches, 22 and 23 respectively, located on the external surface of each side of the housing 24. In this manner, it is assured that the operator's hands always are clear and safe from the internal mechanism of the apparatus during the activation thereof. Further, the spring shaft 20 enables the operator to freely bend the glove in any direction during the inspection of the glove sides.

Intermediate the basket support 14 and the innermost portion 25 of the clamping head 11 is a main driving gear 26 concentrically connected to the main shaft 13 and secured thereto by key 27. The main gear 26 is in mesh simultaneously with a plurality of equally spaced driven gears 28 disposed radially thereto, each gear driving a clamp shaft 31 which in turn imparts movement to a clamping element 32 mounted thereon. The clamp shafts 31 are secured by washers 33 and retaining rings 34. Bearings 35 and 36 are provided about the main shaft 13 and clamp shafts 31, respectively, to assure the free rotation thereof.

As shown in FIG. 4, the clamping element 32 includes a body portion 40 having at one end an opening 41 for insertion of the clamp shaft 31, an arm 42 intermediate the ends of the body and extending laterally therefrom for supporting the gauntlet beading 43, and a clamp face 44 projecting vertically from the other end of the body and extending in an opposing lateral direction to that of the arm 42. A key 45 (FIG. 1) is inserted through each clamp opening 41 and gear 28 to securely lock the clamp about the shafts 31.

Each clamp face 44 is arcuately shaped and of such dimension to extend about a portion of the clamping surface 46 of the clamping head 11 a distance equal to a fraction of the total number of clamps utilized times the clamping surface distance. In other words, if eight clamps are used, the length of each clamp face 44 is ⅛ the clamping surface periphery 46 of the clamp head 11. Thus, when the clamps are fanned outwardly towards the clamping surface and in clamping position, see FIG. 1, the leading end 47 of one clamp engages a portion of the angularly shaped trailing end 48 of the succeeding clamp so as to form a continuous ring having a periphery equal to that of the clamping surface 46 of the clamping head 11. It is to be understood that any number of clamps can be used, the important factor being that the clamps not interfere with each other during the fanning out operation. If desired, a niche 49 can be cut out in a portion of the lateral inner surface of the clamp face 44 so that the leading end 47 of the preceding clamp fits therein. In this manner, the clamps takes up a smaller area to receive smaller size gloves when in the retracted position, as hereinafter explained. The lateral outer surface of the clamp face 44 is tapered and has the same arcuate contour as the clamping surface 46, so that when the gauntlet is clamped therebetween, a continuous seal results and prevents the escape of compressed air inserted into the glove.

When the apparatus is in the normally open retracted position (FIG. 2) the clamps are positioned away from the clamping surface 46. As seen in FIG. 2, the distance between the clamp edge portion 52 and the clamping surface 46 of the clamping head 11 provides the area in which the various size glove gautlets are received. It is noted that the smallest size glove tested is one in which the rim beading 19 just clears the edge portion 52, while the largest size glove tested is one in which the beading barely contacts the clamping surface 46. The glove size range can be increased or decreased by changing the periphery of the clamping surface 46 and the overall dimensions of the clamps 32 accordingly.

In operation, the clamping elements 32 are in a normally open retracted position (FIG. 2). The operator inserts the gauntlet 17 over the spring shaft 20 and support 21 resulting in the glove beading 43 resting on the clamping arms 42. The inflating switches 22, located on each side of the housing 24, are pressed to close contacts 55, 56 (FIG. 5) and current passes therethrough to energize a first coil 57 closing contacts 58 and through a fast operating slow releasing relay 59 closing contacts 60 to activate a solenoid 61 which opens a normally closed four way air valve V1 to admit compressed air into air cylinder 62. At the same time, solenoid 63 is energized to close normally open valve V3. Piston 64, connected to a lever 65 affixed to main shaft 13, is forced outwardly from the air cylinder to rotate the main shaft and drive gear 26 which in turn drives the gears 28 and clamp shafts 31 causing the clamping elements 32 thereon to extend radially towards the clamping surface 46. The glove rotates slightly on the clamp arms 42 and the clamp faces 44 engage and expands the glove gauntlet against the clamping surface 46. The beading 43 of the glove is positioned in a recess 29 of the clamping head and the expansion of the clamping element 32 results in the formation of a continuous seal about the gauntlet.

After the clamps are extended and piston 64 terminates its stroke, lever 65 operates micro-switch 66 which closes the circuit for actuating solenoid 69 through the contacts of a normally closed slow operating relay 68 to open normally closed air valve V2 and permit a predetermined amount of air, regulated by governor 70, to pass through tubing 71 and aperture 72 into air ports 73 to inflate the glove. After a time delay, the contacts of relay 68 open to deenergize solenoid 69 to cut off the glove inflating supply. The exhaust valve V3 is still closed at this time and the air is unable to escape from the glove. Seals 74 and 75 are provided in the clamp head 11 and base 10, respectively, to insure that no air escapes during the testing of the glove.

After the glove is inspected, the deflating switches 23 are pressed to open contacts 76 and 77 to deenergize the circuit. Contact 58 opens and solenoid 63 is deenergized returning V3 to its normally open position to permit the air to escape from the inflated glove. After its time delay, contacts 60 of relay 59 open to deenergize solenoid 61 and energize solenoid 78 of clamping valve V1 causing valve V1 to open and exhaust piston 64 to return to its normal position in the cylinder. The main drive shaft 13 rotates to retract the clamping elements 28 and the glove is removed from the apparatus which is now ready to commence a new cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing resilient articles, which comprises, a housing having an annularly shaped opening therein, a plurality of normally open radially spaced clamps disposed within the housing, each clamp having an arcuately shaped face of the same contour as a portion of the inner surface of the housing and opposing end elements on the face, means for radially fanning the clamps outwardly causing the faces to expand and clamp the article placed thereover against the surface, the end elements of each face contacting one another in the closed clamped position so as to provide a continuous seal about the inner surface of the article, and means for passing compressed air into the housing to inflate the article.

2. An apparatus for testing resilient articles, such as lineman's rubber gloves having a gauntlet portion, which comprises, a housing having an annularly shaped opening therein, a plurality of normally retracted radially spaced clamps disposed about the central axis of the housing, each clamp having a body portion upon which is mounted an arcuately shaped face of the same contour as a portion of the clamping surface of the housing, opposing end elements on the member, means for supporting the gauntlet portion over the members in the retracted positions, driving means for radially fanning the clamps outwardly simultaneously so as to cause the members to expand and clamp the gauntlet against the clamping surface, the end elements of each member contacting each other in the expanded position to provide a seal about the inner surface of the gauntlet, and means for passing compressed air into the housing to inflate the glove.

3. An apparatus according to claim 2 for testing gloves with a beaded rim terminating the gauntlet portion, in which each clamp has a projecting arm extending from the body portion beneath the face toward and below the clamping surface upon which the beaded portion of the glove is supported during the movement of the clamps from the normally open retracted position to the closed clamping position, a recess being provided in the housing for receiving the arms.

4. An apparatus according to claim 2 in which the clamp face members are shaped arcuately longitudinally and the total distance of the clamp's outer surfaces are equal to the periphery of the housing inner lateral surface against which the gauntlet is clamped so as to provide a continuous seal about the glove gauntlet.

5. An apparatus according to claim 2 in which the supporting means includes a mushroom type basket having a base mounted on the driving means with a body portion extending upwardly therefrom having a plurality of angularly disposed elements in angular alignment with respect to thte face members for guiding the gauntlet thereover, and a resilient shaft being connected at one end to the basket and having at the other end a spherically shaped support for holding the glove and permitting movement thereof during the operation of the device.

References Cited in the file of this patent

UNITED STATES PATENTS

| | | |
|---|---|---|
| 2,370,945 | Fields | Mar. 6, 1945 |
| 2,682,924 | Lomazzo | July 6, 1954 |
| 2,800,788 | Smith | July 30, 1957 |